(12) United States Patent
Natu et al.

(10) Patent No.: US 7,117,353 B2
(45) Date of Patent: Oct. 3, 2006

(54) METHODS AND APPARATUS TO ENABLE CONSOLE REDIRECTION IN A MULTIPLE EXECUTION ENVIRONMENT

(75) Inventors: Mahesh S. Natu, Portland, OR (US); Rahul Khanna, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 10/654,847

(22) Filed: Sep. 4, 2003

(65) Prior Publication Data

US 2005/0055486 A1    Mar. 10, 2005

(51) Int. Cl.
*G06F 9/00* (2006.01)
(52) U.S. Cl. .............................. 713/2; 713/1; 713/100
(58) Field of Classification Search ............ 713/1, 713/2, 100
See application file for complete search history.

(56) References Cited

U.S. PATENT DOCUMENTS

| | | | |
|---|---|---|---|
| 5,978,912 A * | 11/1999 | Rakavy et al. | 713/2 |
| 6,317,798 B1 * | 11/2001 | Graf | 710/15 |
| 6,321,287 B1 * | 11/2001 | Rao et al. | 710/260 |
| 6,609,151 B1 * | 8/2003 | Khanna et al. | 709/222 |
| 2004/0267998 A1 * | 12/2004 | Zimmer et al. | 710/261 |

OTHER PUBLICATIONS

*Windows Platform Design Notes: Building Hardware and Firmware to Complement Microsoft Windows Headless Operation*, Microsoft Corporation, pp. 1-14 (Version 1.00, Jul. 16, 2002).

* cited by examiner

Primary Examiner—Thomas Lee
Assistant Examiner—Malcolm Cribbs
(74) Attorney, Agent, or Firm—Hanley, Flight & Zimmerman, LLC

(57) ABSTRACT

Methods and apparatus to enable console redirection in a multiple execution environment are disclosed. In an example method, at least one periodic interrupt in a first basic input/output system (BIOS) execution environment of a local console is initiated. Data associated with a second BIOS execution environment of the local console is retrieved. The data associated with the second BIOS execution environment is communicated to a remote terminal.

30 Claims, 3 Drawing Sheets

METHODS AND APPARATUS TO ENABLE CONSOLE REDIRECTION IN A MULTIPLE EXECUTION ENVIRONMENT

TECHNICAL FIELD

The present disclosure relates generally to firmware, and more particularly, to methods and apparatus to enable console redirection in a multiple execution environment.

BACKGROUND

Today, many computers or processor systems are managed remotely (i.e., console redirection) to provide greater convenience and flexibility. In particular, a remote terminal (e.g., a desktop computer or a laptop computer) may be connected to a local computer (e.g., a server) via a communication link such as a wired link and/or a wireless link. Console redirection allows the remote terminal to access the local computer in a text mode and/or a graphics mode. In the text mode, for example, console redirection enables the remote terminal to control the basic input/output system (BIOS) of the local computer. As will be readily appreciated by those having ordinary skill in the art, the remote terminal may be in the same office, in a different building, in another city, or even on the opposite side of the world from the local computer. That is, the remote terminal may display a text pre-boot screen reflecting BIOS settings of the local computer so that a system administrator at the remote terminal may modify or change configurations of the local computer BIOS. As another example of text mode operation, the system administrator may also execute a disk operating system (DOS) command from the remote terminal if the local computer is running DOS. In the graphics mode, the remote terminal may receive screen information (i.e., postboot graphics screen) from the local computer so that a system administrator may manage the local computer from the remote terminal as if the system administrator were in front of the local screen of the local computer.

Some computers or processor systems may operate in a multiple execution environment. For example, some computers or processor systems may include extensible firmware interface (EFI) drivers (i.e., in 32-bit code and/or 64-bit code) and 16-bit code. However, some components and/or operating systems may support console redirection. Accordingly, some local computers may be administered remotely and some may not. As will be readily appreciated, information services personnel and other administrators would enjoy enhanced productivity if all local computers could be administered remotely.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
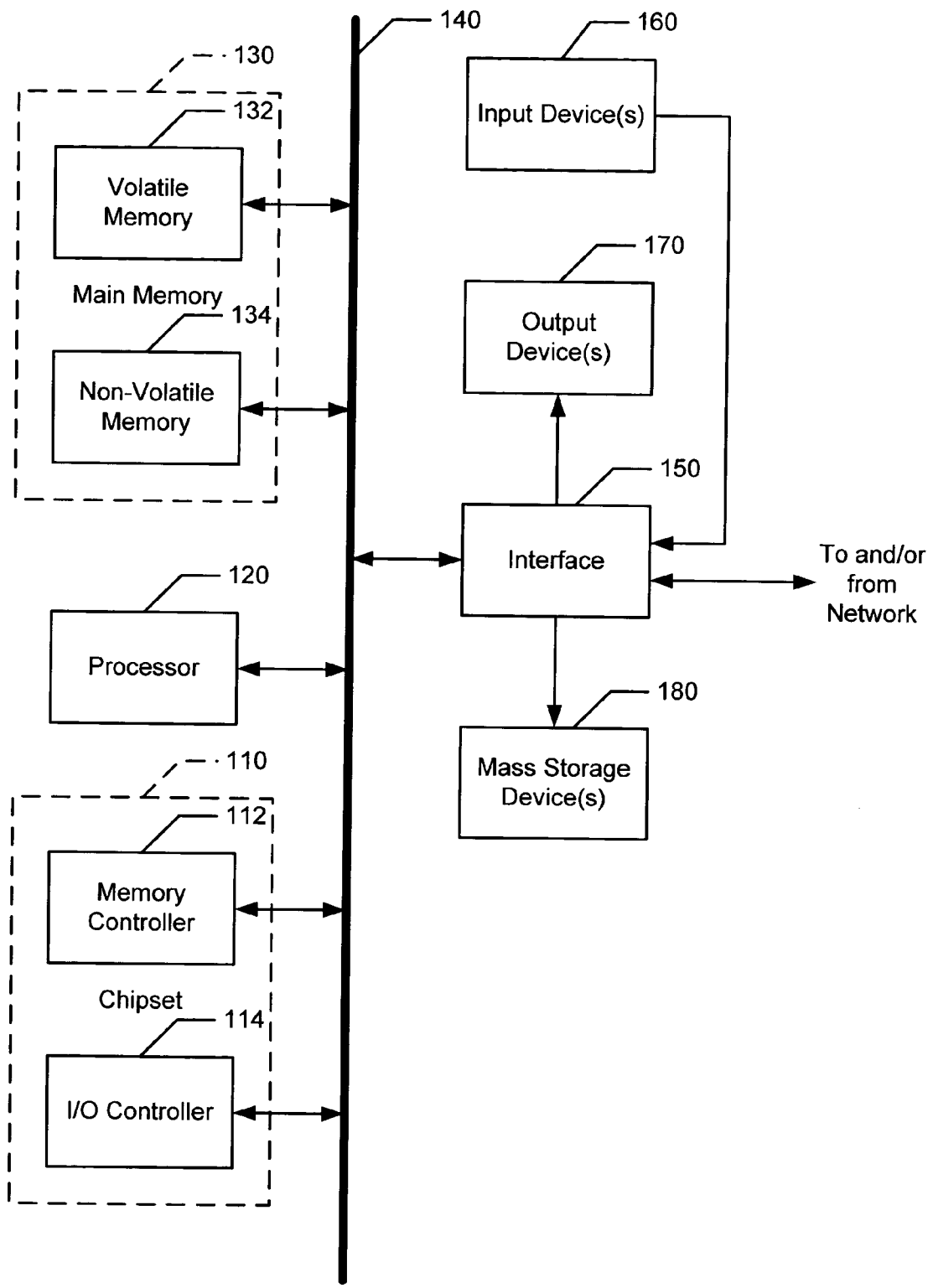
FIG. 1 is a block diagram representation of an example processor system.

FIG. 1 is a block diagram of an example processor system 100 adapted to implement the methods and apparatus disclosed herein. The processor system 100 may be a desktop computer, a laptop computer, a notebook computer, a personal digital assistant (PDA), a server, an Internet appliance or any other type of computing device.

The processor system 100 illustrated in FIG. 1 includes a chipset 110, which includes a memory controller 112 and an input/output (I/O) controller 114. As is well known to those having ordinary skill in the art, a chipset typically provides memory and I/O management functions, as well as a plurality of general purpose and/or special purpose registers, timers, etc. that are accessible or used by a processor 120. In the example of FIG. 1, the processor 120 is implemented using one or more processors. For example, the processor 120 may be implemented using one or more of the Intel® Pentium® family of microprocessors, the Intel® Itanium® family of microprocessors, Intel® Centrino® family of microprocessors, and/or the Intel XScale® family of processors. In the alternative, other processors or families of processors may be used to implement the processor 120.

As is conventional, the memory controller 112 performs functions that enable the processor 120 to access and communicate with a main memory 130, which includes a volatile memory 132 and a non-volatile memory 134, via a bus 140. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 134 may be implemented using flash memory, Read Only Memory (ROM), Electrically Erasable Programmable Read Only Memory (EEPROM), and/or any other desired type of memory device.

The processor system 100 also includes an interface circuit 150 that is coupled to the bus 140. The interface circuit 150 may be implemented using any type of well known interface standard such as an Ethernet interface, a universal serial bus (USB), a third generation input/output interface (3GIO) interface (i.e., peripheral component interconnect (PCI) Express), and/or any other suitable type of interface.

One or more input devices 160 are connected to the interface circuit 150. The input device(s) 160 permit a user to enter data and commands into the processor 120. For example, the input device(s) 160 may be implemented by a keyboard, a mouse, a touch-sensitive display, a track pad, a track ball, an isopoint, and/or a voice recognition system.

One or more output devices 170 are also connected to the interface circuit 150. For example, the output device(s) 170 may be implemented by display devices (e.g., a light emitting display (LED), a liquid crystal display (LCD), a cathode ray tube (CRT) display, a printer and/or speakers). The interface circuit 150, thus, typically includes, among other things, a graphics driver card (not shown).

The processor system 100 also includes one or more mass storage devices 180 configured to store software and data. Examples of such mass storage device(s) 180 include floppy disks and drives, hard disk drives, compact disks (CDs) and drives, and digital versatile disks (DVDs) and drives.

The interface circuit 150 also includes a communication device such as a modem or a network interface card (not shown) to facilitate exchange of data with external computers via a network. The communication link between the processor system 100 and the network may be any type of network connection such as an Ethernet connection, a digital subscriber line (DSL), a telephone line, a cellular telephone system, a coaxial cable, etc.

Access to the input device(s) 160, the output device(s) 170, the mass storage device(s) 180 and/or the network is typically controlled by the I/O controller 114 in a conventional manner. In particular, the I/O controller 114 performs functions that enable the processor 120 to communicate with the input device(s) 160, the output device(s) 170, the mass storage device(s) 180, and/or the network via the bus 140 and the interface circuit 150.

While the components shown in FIG. 1 are depicted as separate functional blocks within the processor system 100, the functions performed by some of these blocks may be integrated within a single semiconductor circuit or may be implemented using two or more separate integrated circuits. For example, although the memory controller 112 and the I/O controller 114 are depicted as separate functional blocks within the chipset 110, persons of ordinary skill in the art will readily appreciate that the memory controller 112 and the I/O controller 114 may be integrated within a single semiconductor circuit.

Figure 2:
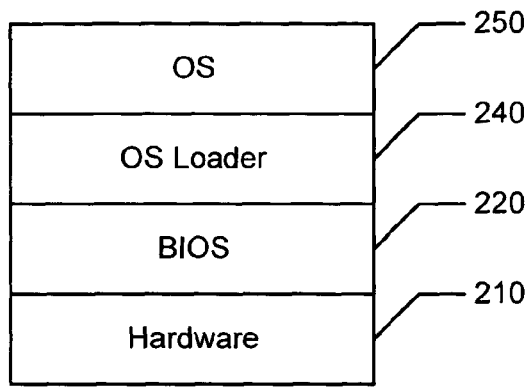
FIG. 2 is a block diagram representation of an example architectural hierarchy of the example processor system shown in FIG. 1.

In the example of FIG. 2, the illustrated architectural hierarchy 200 of the processor system 100 includes hardware 210, a BIOS 220, an operating system (OS) loader 240, and an operating system (OS) 250. Persons of ordinary skill in the art will readily recognize that hardware 210 may include any physical aspect of the processor system 100 such as the processor 120 and the main memory 130. Hardware 210 also includes the interface circuit 150, input device(s) 160, output devices 170, and/or the mass storage device 180. Basically, hardware 210 is any or all of the components shown in FIG. 1.

The initial phases of computer or processor system operation (i.e., prior to the booting of the OS 250 by the processor system 100) following a power-up or a reset are controlled by the BIOS 220. In general, the BIOS 220 is implemented as software or firmware in the form of machine readable instructions that are stored in the non-volatile memory 134 coupled to the processor 120. Following a reset operation or the application of power to the processor 120, the processor 120 executes the BIOS instructions. Typically, the BIOS 220 performs one or more hardware and software configuration and test activities prior to booting the OS 240. The configuration activities carried out by the BIOS 220 are responsible for establishing the manner in which hardware devices 210 (e.g., disk drives, video controllers, keyboard, mouse, etc.) associated with the processor system 100 interact with the OS 250 executed by the processor system 100. The test activities collect system configuration information that may be later used, for example, by the OS 250 to determine that hardware or devices associated with the processor system 100 are ready for use and to facilitate debugging activities, configuration management activities, etc. The BIOS 220 may be implemented as software, firmware, or machine readable instructions configured to boot up (i.e., start up) the processor system 100 in a conventional manner. Parts of the functionality of the BIOS 220 may be implemented as extensible firmware interface (EFI) drivers with the remaining parts implemented as legacy 16-bit code. The EFI drivers in the BIOS 220 may be responsible for initializing hardware devices (e.g., disk drives, video controllers, keyboard, mouse, etc.) and/or collecting system configuration data for later use. Further, the EFI drivers may execute in a different environment than the 16-bit real mode code. For example, the EFI drivers may be in 32-bit code for the Intel® Pentium® family of microprocessors. In another example, the EFI drivers may be in 64-bit code for the Intel® Itanium® family of microprocessors. After the initialization activity, the BIOS 220 may hand off controls to the OS loader 240. In addition to executing an execution environment for BIOS drivers, the EFI specification defines an interface between the BIOS 220 and the OS loader 240. The BIOS 220 constructed from the EFI drivers and the 16-bit code may be used to boot both types of operating systems (i.e., one that follows the EFI interface and/or one that does not follow the EFI interface).

The OS loader 240 is a component that locates a given program in offline storage, loads it into main storage, and gives that program control of the processor system 100. For example, the OS loader 240 may locate part of the OS 250 from a hard disk drive of the processor system 100 (i.e., the mass storage device 180), load it into a random access memory of the processor system 100 (i.e., the volatile memory 132), and allow the OS 250 to execute its instructions.

Figure 3:
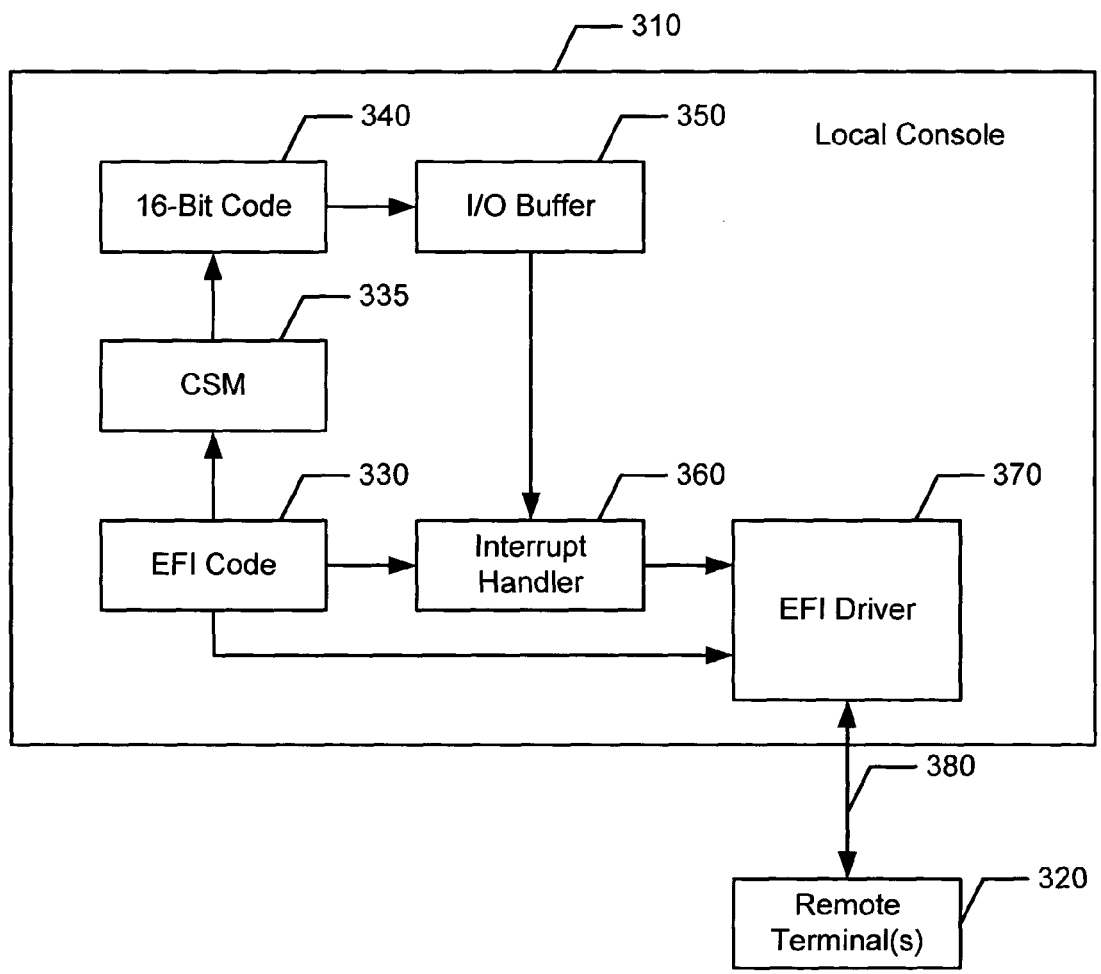
FIG. 3 is a block diagram representation of an example console redirection system.

In the example of FIG. 3, an illustrated console redirection system 300 includes a local console 310 and a remote terminal 320. The console redirection system 300 is configured to provide the remote terminal 320 access to the local console 310. In particular, the console redirection system 300 may provide text console redirection, graphics console redirection, keyboard console redirection, and/or mouse console redirection in a multiple execution environment. For example, the local console 310 (e.g., a server) may include EFI drivers and 16-bit code. The console redirection system 300 may enable the remote terminal 320 (e.g., a laptop computer) to control the BIOS 220 of the local console 310 in the same office, in a different building, in another city, or even on the opposite side of the world. In particular, the local console 310 provides the remote terminal 320 with screen information (e.g., pre-boot text screen(s) and/or post-boot graphics screen(s)). Thus, a system administrator may manage the local console 310 from the remote terminal 320 as if the system administrator were in front of the local console.

The local console 310 and/or the remote terminal 320 may be implemented using the processor system 100 described above. In particular, the local console 310 includes an EFI code 330, a compatible support module (CSM) 335, a 16-bit code 340, an input/output buffer 350, an interrupt handler 360, an EFI driver 370, and a communication link 380. The remote terminal 320 is operatively coupled to the local console 310 via the communication link 380 (e.g., a local area network (LAN) connection, an Ethernet connection, a serial connection, a wireless connection, and/or any other suitable type of connection).

As noted above, the BIOS 220 (e.g., via the EFI code 330) supports platform initialization and console redirection of the local console 310. However, some components and/or operating systems use 16-bit code for initialization. The 16-bit code 340 is configured to support peripheral hardware such as disk drives, a compact-disk read only memory (CD-ROM) drives, printers, scanners and/or monitors via a small computer system interface (SCSI or "scuzzy"). For example, the 16-bit code 340 may be used to communicate with option ROMs on add-in cards. The 16-bit code 340 is also configured to support operation systems such as disk operating system (DOS). To support non-EFI components, the EFI code 330 initiates the CSM 335 to interface with 16-bit components and/or operating systems.

When the EFI code 330 (e.g., 32-bit code and/or 64-bit code) is in control, the EFI code 330 directly communicates with the EFI driver 370 to enable EFI console redirection in the multiple execution environment. When the 16-bit code 340 is in control (i.e., when the EFI console redirection is unavailable), however, the interrupt handler 360 is configured to initiate a periodic interrupt such as a system management interrupt (SMI) or a platform management interrupt (PMI). Further, the interrupt handler 360 is configured to capture the contents of the I/O buffer 350 (e.g., a local screen of the local console 310) to enable console redirection in the multiple execution environment. For example, the interrupt handler 360 may read the I/O buffer 350 to retrieve screen information of the local console 310 and transmit the screen information to the EFI driver 370.

The EFI driver 370 is configured to communicate data of the local console 310 to the remote terminal 320 via the communication link 380 so that the remote terminal 320 is configured to access the local console 310 from a remote location (i.e., console redirection). For example, the local console 310 may direct a pre-boot text screen (e.g., BIOS screen) and/or a post-boot graphics screen (e.g., Windows® screen) to the remote terminal 320 via a local area network (LAN) connection, an Ethernet connection, a serial connection, a wireless connection, and/or any other suitable connection. In particular, the interrupt handler 360 captures and relays the contents of the I/O buffer 350 to the EFI driver 370. As noted above, the EFI code 330 initiates the CSM 335 to support non-EFI components such as components associated with 16-bit code 340. When the EFI code 330 initiates the CSM 335 and the 16-bit code 340, the EFI code 330 is not in control (i.e., native console redirection by the EFI code 330 is lost). Regardless of whether the local console 210 is in the EFI code environment or the 16-bit code environment, the remote terminal 320 operates the same way. While the example console redirection system 300 illustrated in FIG. 3 is depicted with 16-bit code 340, the console redirection system 300 may be implemented to enable console redirection in the multiple execution environment for other legacy code.

Figure 4:
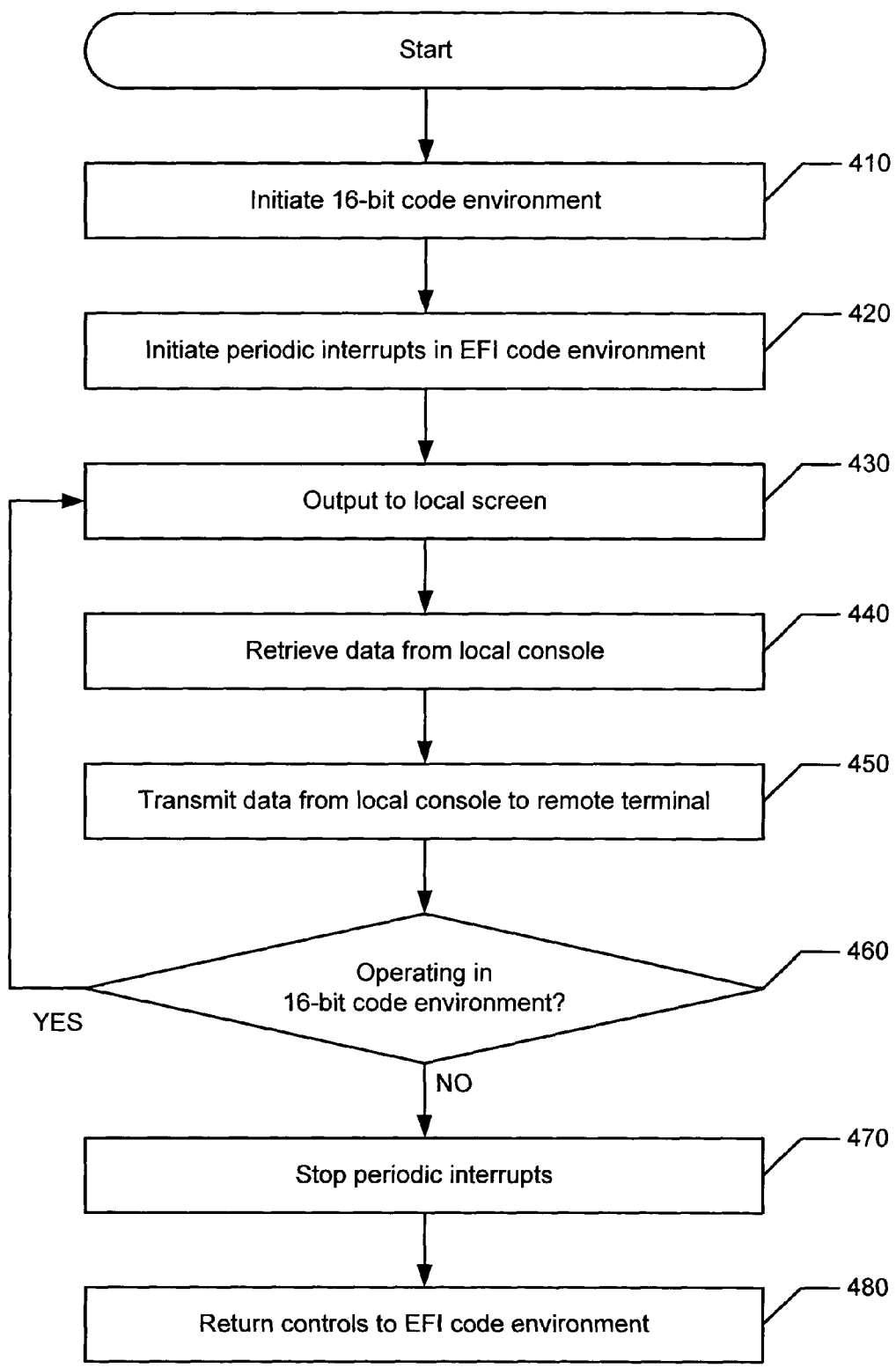
FIG. 4 is a flow diagram representation of example machine readable instructions that may be used to enable console redirection in a multiple execution environment.

Machine readable instructions that may be executed by the processor system 100 (e.g., via the processor 120) are illustrated in FIG. 4. Persons of ordinary skill in the art will appreciate that the instructions can be implemented in any of many different ways utilizing any of many different programming codes stored on any of many computer-readable mediums such as a volatile or nonvolatile memory or other mass storage device (e.g., a floppy disk, a CD, and a DVD). For example, the machine readable instructions may be embodied in a machine-readable medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. Further, although a particular order of actions is illustrated in FIG. 4, persons of ordinary skill in the art will appreciate that these actions can be performed in other temporal sequences. Again, the flow chart 400 is merely provided as an example of one way to program the processor 120 to enable console redirection in the multiple execution environment.

In the example of FIG. 4, the processor 120 initiates operation in the 16-bit code environment 340 (block 410) and then initiates at least one periodic interrupt in the EFI code environment 330 of the local console 310 (block 420). For example, the processor 120 may initiate an SMI or a PMI in the EFI code environment 330 before the 16-bit code environment 340 is initiated by a component operating in 16-bit code (e.g., option ROMs on add-in cards). Then, the processor 120 outputs/updates data associated with the 16-bit code environment 340 in the I/O buffer 350 of the local console 310 (block 430).

In response to the periodic interrupt initiated in the EFI code environment 330, the processor 120 retrieves the data associated with the 16-bit code environment 340 of the local console 310 (block 440). For example, the processor 120 may capture the contents of the I/O buffer 350. Alternatively, the processor 120 may only capture changes in the contents of the I/O buffer 350 to optimize the amount of data retrieved. To enable console redirection in the multiple execution environment, the processor 120 transmits the data associated with the 16-bit code environment 340 from the local console 310 to the remote terminal 320 via the communication link 380 (block 450). For example, the processor 120 may transmit the contents of the I/O buffer 350 to the remote terminal 320 via a LAN connection, a serial connection, a wireless connection, and/or any other suitable connection so that the remote terminal 320 may access the local console 310.

The processor 120 determines whether the 16-bit code environment is still operating (block 460). If the 16-bit code environment 340 is still operating then the controls return to block 430. Otherwise, the processor 120 stops the periodic interrupt (block 470), and controls are returned to the EFI code environment 330 (block 480). For example, some operating systems (e.g., Microsoft Windows 2000®) switch the local screen from text mode to graphics mode. The processor 120 may turn off the periodic interrupt if console redirection is undesired. For example, the processor 120 may turn off the periodic interrupt to avoid delays when the OS 250 is in control. As a result, it is unnoticeable that the BIOS 220 goes from the EFI code environment 330 to the 16-bit code environment 340 and back to the EFI code environment 330 because the processor 120 enables console redirection in the multiple execution environment for the 16-bit code environment 340. Further, the remote terminal 320 operates the same way regardless of whether the EFI code environment 330 or the 16-bit code environment 340 is in control.

The methods and apparatus disclosed herein are particularly well suited for server platforms. However, persons of ordinary skill in the art will appreciate that the teachings of the disclosure may be applied to desktop platforms and/or other suitable environments.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to enable console redirection in a multiple execution environment comprising:

initiating at least one periodic interrupt in a first basic input/output system (BIOS) execution environment of a local console;

retrieving data associated with a second BIOS execution environment of the local console that is different than the first BIOS execution environment; and communicating the data associated with the second BIOS execution environment to a remote console.

2. A method as defined in claim 1, wherein initiating the periodic interrupt in the first BIOS execution environment of the local console comprises initiating at least one of a system management interrupt and a platform management interrupt in the first BIOS execution environment of the local console.

3. A method as defined in claim 1, wherein initiating the periodic interrupt in the first BIOS execution environment of the local console comprises initiating the periodic interrupt in an extensible firmware interface (EFI) environment of the local console.

4. A method as defined in claim 1, wherein retrieving data associated with the second BIOS execution environment of the local console comprises retrieving data associated with a 16-bit code environment of the local console.

5. A method as defined in claim 1, wherein retrieving data associated with the second BIOS execution environment of the local console comprises retrieving data associated with at least one of a keyboard input, a mouse input, and a video output of the local console.

6. A method as defined in claim 1, wherein communicating the data to the remote terminal comprises communicating the data to the remote terminal via at least one of a wired link and a wireless link.

7. A method as defined in claim 1, wherein the console redirection comprises at least one of text console redirection, graphics console redirection, keyboard console redirection, and mouse console redirection.

8. A method as defined in claim 1 further comprising terminating the at least one periodic interrupt in response to a terminating operation in the second BIOS execution environment.

9. A machine readable medium storing instructions, which when executed, cause a machine to:

initiate at least one periodic interrupt in a first basic input/output system (BIOS) execution environment of a local console;

retrieve data associated with a second BIOS execution environment of the local console that is different than the first BIOS execution environment; and communicate the data associated with the second BIOS execution environment to a remote terminal.

10. A machine readable medium as defined in claim 9, wherein the instructions cause the machine to initiate the periodic interrupt in the first BIOS execution environment of the local console by initiating at least one of a system management interrupt and a platform management interrupt in the first BIOS execution environment of the local console.

11. A machine readable medium as defined in claim 9, wherein the instructions cause the machine to initiate the periodic interrupt in the first BIOS execution environment of the local console by initiating the periodic interrupt in an extensible firmware interface (EFI) environment of the local console.

12. A machine readable medium as defined in claim 9, wherein the instructions cause the machine to retrieve data associated with the second BIOS execution environment of the local console by retrieving data associated with a 16-bit code environment of the local console.

13. A machine readable medium as defined in claim 9, wherein the instructions cause the machine to retrieve data associated with the second BIOS execution environment of the local console by retrieving data associated with at least one of a keyboard input, a mouse input, and a video output of the local console.

14. A machine readable medium as defined in claim 9, wherein the console redirection comprises at least one of text console redirection, graphics console redirection, keyboard console redirection, and mouse console redirection.

15. A machine readable medium as defined in claim 9 further comprising instructions, which when executed, cause a machine to terminate the at least one periodic interrupt in response to terminating operation in the second BIOS execution environment.

16. A machine readable medium as defined in claim 9, wherein the machine readable medium comprises one of a programmable gate array, application specific integrated circuit, erasable programmable read only memory, read only memory, random access memory, magnetic media, and optical media.

17. An apparatus to perform console redirection in a multiple execution environment comprising:

an interface circuit configured to provide a communication link; and a processor operatively coupled to the interface circuit, the processor being programmed to initiate at least one periodic interrupt in a first basic input/output system (BIOS) code environment of a local console, to retrieve data associated with a second BIOS code environment of the local console that is different than the first BIOS execution environment, and to communicate the data associated with the second BIOS code environment to a remote terminal via the communication link.

18. An apparatus as defined in claim 17, wherein the periodic interrupt comprises at least one of a system management interrupt and a platform management interrupt.

19. An apparatus as defined in claim 17, wherein the first BIOS execution environment comprises an extensible firmware interface (EFI) environment.

20. An apparatus as defined in claim 17, wherein the second BIOS execution environment comprises a 16-bit code environment.

21. An apparatus as defined in claim 17, wherein data associated with the second BIOS execution environment comprises data associated with at least one of a keyboard input, a mouse input, and a video output of the local console.

22. An apparatus as defined in claim 17, wherein the console redirection comprises at least one of text console redirection, graphics console redirection, keyboard console redirection, and mouse console redirection.

23. An apparatus as defined in claim 17, wherein the processor is configured to terminate the at least one periodic interrupt in response to a terminating operation in the second BIOS execution environment.

24. A processor system to enable console redirection in a multiple execution environment comprising:

a communication interface configured to provide a communication link; and a processor operatively coupled to the communication interface, the processor being programmed to initiate at least one periodic interrupt in a first basic input/output system (BIOS) execution environment of a local console, to retrieve data associated with a second BIOS execution environment of the local console that is different than the first BIOS execution environment, and to communicate the data associated with the second BIOS execution environment to a remote terminal via the communication link.

25. A processor system as defined in claim 24, wherein the periodic interrupt comprises at least one of a system management interrupt and a platform management interrupt.

26. A processor system as defined in claim 24, wherein the first BIOS execution environment comprises an extensible firmware interface (EFI) environment.

27. A processor system as defined in claim 24, wherein the second BIOS execution environment comprises a 16-bit code environment.

28. A processor system as defined in claim 24, wherein data associated with the second BIOS execution environment comprises data associated with at least one of a keyboard input, a mouse input, and a video output of the local console.

29. A processor system as defined in claim 24, wherein the console redirection comprises at least one of text console redirection, graphics console redirection, keyboard console redirection, and mouse console redirection.

30. A processor system as defined in claim 24, wherein the processor is configured to terminate the at least one periodic interrupt in response to a terminating operation in the second BIOS execution environment.

* * * * *